United States Patent [19]

Gazzard et al.

[11] 4,216,043

[45] Aug. 5, 1980

[54] EMBOSSED PATTERNING OF ASBESTOS-CEMENT AND LIKE SHEETS

[75] Inventors: Warwick H. Gazzard, St. Ives; Roger M. Kearin, Galston, both of Australia

[73] Assignee: James Hardie & Coy. Pty. Limited, Sydney, Australia

[21] Appl. No.: 845,023

[22] Filed: Oct. 25, 1977

Related U.S. Application Data

[62] Division of Ser. No. 629,539, Nov. 6, 1975, Pat. No. 4,072,460.

[30] Foreign Application Priority Data

Nov. 7, 1974 [AU] Australia ............................ PB9519

[51] Int. Cl.² ............................................ B29D 9/00

[52] U.S. Cl. .................................. 156/193; 156/219; 264/163; 264/220; 264/293; 264/308; 264/316

[58] Field of Search ............... 264/163, 293, 225, 162, 264/284, 308, 219, 220, 316; 156/193, 219

[56] References Cited

U.S. PATENT DOCUMENTS

| | | | |
|---|---|---|---|
| 2,171,155 | 8/1939 | Wright, Jr. | 264/DIG. 57 |
| 2,316,143 | 4/1943 | Peebles et al. | 264/225 |
| 2,803,577 | 8/1957 | Colt et al. | 425/373 |
| 2,818,824 | 1/1958 | Read et al. | 264/284 |
| 3,000,776 | 9/1961 | Swensen | 425/373 |
| 3,311,692 | 3/1967 | Baird | 264/293 |
| 3,369,066 | 2/1968 | Quint et al. | 264/308 |
| 3,374,303 | 3/1968 | Metz, Jr. | 264/284 |
| 3,387,351 | 6/1968 | Roosen | 264/219 |
| 3,491,174 | 1/1970 | Hamme et al. | 264/293 |
| 3,619,446 | 11/1971 | Nauta | 264/284 |
| 3,723,245 | 3/1973 | Blary | 264/308 |
| 4,078,031 | 3/1978 | Bishop | 264/293 |

*Primary Examiner*—James B. Lowe

*Attorney, Agent, or Firm*—Stevens, Davis, Miller & Mosher

[57] ABSTRACT

To provide asbestos-cement and like sheets which are formed by build-up of a thin film on a rotating size roll, with an embossed patterned surface; a flexible mold layer of epoxy resin or like moldable material having counterpart embossments molded thereon, is removably wrapped about and secured to the size roll with its patterned side outward and before commencement of film build-up on the roll.

3 Claims, 5 Drawing Figures

EMBOSSED PATTERNING OF ASBESTOS-CEMENT AND LIKE SHEETS

This is a division of application Ser. No. 629,539 filed Nov. 6, 1975 now U.S. Pat. No. 4,072,460.

The object of this invention is to provide a simple way to ornament asbestos-cement and like sheets (hereinafter called "material" sheets) by mold embossed or intaglio patternings thereon. The patternings may be in simulation of wood graining, carving or engraving, and may take the form of striations, geometrical designs, floral designs, printed messages, or any other forms amenable to formation in depth in a sheet surface; that is, delineations which while not penetrating deeply into the sheet material from an outer surface thereof, are nevertheless three-dimensional, as distinct from being merely superficial as is the case with painted, printed or like ornamentations.

The invention is applicable to flat material sheets usable as cladding sheets, wallboards, partitionings and the like, provided the sheets, are of the kind formed by "sizing" or building-up a thin film-like layer on a roll (of the kind known in the art as a "size" roll) into the required sheet thickness and then cutting them and removing them from the roll, flattening them and otherwise treating them to give the required finished sheet. The invention is thus applicable to a number of material sheets such as those in which paper, timber pulp or other materials predominate; however, the invention is primarily intended for application to building sheets of asbestos-cement, and will be described herein mainly in terms of that particular application.

A common way of making asbestos-cement sheets (that which is relevant to the present invention) consists in the formation of a thin, wet, film-like layer of asbestos-cement stock (about 0.5 mm thick, for example)-which is wound, like a wet paper, on a size roll until the wound material is of such thickness as will provide the required thickness of the finished sheets. The size roll length (axially) is somewhat greater than the width required of the finished sheets and the circumference of the roll is somewhat greater than the length required of the finished sheets. The size roll has a longitudinally extending groove in its outer surface, and this groove houses a parting wire. When the required thickness of stock has been wound on the roll, the parting wire is moved radially outwardly so to sever through the cylindrical sleeve built up on the roll. The stock layer, or sleeve is then peeled from the roll, laid out flat, edge trimmed to sheet size and cured to hardness.

In the work which led up to the present invention consideration was given to formation of the size roll surface itself as a counterpart or mold for the required material sheet patternings. This expedient was rejected however because of its shortcomings: the cost of machining or otherwise patterning the roll surface was economically prohibitive; once counterpart patterned in one design, the roll was useless not only for production of other designs, but also for the production of conventional smooth sufaced sheets; and, there is great difficulty in giving a patterned roll surface a sufficiently smooth surface finish as will ensure ready peeling of the severed sleeves from the roll.

The present invention avoids the disabilities mentioned above in a simple but effective manner.

The invention provides a method of producing asbestos-cement and like material sheets with embossed patternings thereon, said method comprising the steps:

(a) forming a flat flexible mold layer with at least part of one face patterned in counterpart to the required material sheet embossed patterning, (b) closely wrapping said flexible mold layer, patterned face out, about a size roll, (c) removably securing the wrapped flexible mold layer to said size roll, (d) building up a material sleeve on said wrapped size roll, and (e) severing said sleeve in a direction parallel to the roll axis, removing said severed sleeve from said wrapped size roll and otherwise treating said sleeve to provide a finished, flat material sheet.

The flat flexible molding layer is made of any appropriate material able to have the required patterning impressed in one of its surfaces, or one which of its own nature displays and provides the patterning required.

In this last category the flexible mold layer may be a sheet of canvas or other woven material, a wire mesh material, a layer of striated ply-wood, a deeply etched metal sheet, or any other material provided it be one having a patterning or texture able to give the required patterning in the finished material sheet, and provided it is sufficiently flexible to be amenable to being wrapped about a size roll and to being secured thereto. With such a flexible mold layer the step of forming it may consist in no more than cutting it to size for application to the size roll.

It will be understood that a flexible mold layer could be of such size as to fully envelope the size roll yet have some of its work surface quite smooth and the remainder selectively embossed as may be required.

The flexible mould layer may be made of any of several different plastics materials such, for example, as that known as "ABS" (Acrylonitrile butadiene styrene). For preference however, the moulding layer is made from an epoxy resin reinforced with glass fibers.

In carrying the invention into practical effect a flat moulding bed is prepared with its upper surface patterned in direct accordance with the patterning to appear on the material sheet. The moulding bed may be of any material to which the required patterning may be readily applied, or which of itself is already of that required patterning. One suitable bed material is timber, and if the required patterning is one in simulation of timber graining, the timber is selected accordingly, it being necessary, of course, for the grain to stand out sufficiently to give the required three-dimensional effect for the eventual patterning; alternatively, the grain may be "brought up" by sand-blasting the timber so that the softer portions are eroded more than the harder parts.

If ABS is employed, a sheet of that material may be heated to soften it and then simply pressed on to the moulding bed.

For preference, the flexible mold layer is made of an epoxy resin reinforced with glass or other fibers which may be in the form of regularly or randomly laid rovings, or one or more layers or mats of woven fabric.

In preparing the reinforced epoxy flexible mold layer, the molding bed is preferably waxed and coated with a release agent. The wax may be any beeswax paste provided it does not contain any silicone oil. It may be that known as "traffic wax paste" and it is applied by brushing sparingly so as not to fill in the mould pattern.

The release agent may be any polyvinyl alcohol solution preferably contrastingly colored to be distinguishable when applied to the waxed surface. This agent may be that commonly known as "Red release agent". It is sparingly and evenly applied to the waxed bed; that is, so that there will be substantially no build up in the pattern cavities.

When the release agent is dry to the touch, the mold layer material is applied to the molding bed.

By way of example, a suitable molding layer material may be prepared by mixing 6 Kg. of epoxy resin (e.g. that known as Epikote 828) with 1 Kg. of a plasticizer (e.g. that known as Corffex 400). These are stirred until the mix is clear, and then 4 Kg. of a hardener (e.g. that known as Polymid 75) is added. This final mix is then stirred until it becomes clear (following the initial pearly appearance which arises upon addition of the hardener).

The final mix is poured onto the prepared horizontal molding bed and spread evenly thereon by use of a paint roller or a plastics scraper. The reinforcement mat is then applied and "wetted down"; that is, thoroughly wetted by and immersed in the final mix, by use of a plastics scraper, spatula or the like. In this action the applied materials are well worked so to ensure freeing of bubbles. Before setting of the applied final mix, a further layer of reinforcing material may be added and wetted down by further addition and working of final mix. Such addition is preferably made but with consideration for the desirability of the eventual flexible mould layer being about $\frac{1}{8}$ inches in thickness.

The mold layer is allowed to cure (simply being left overnight will usually suffice) and then carefully separated from the molding bed to avoid breakage or cracking. This is best done by raising clear one end of the mold layer and then rolling a dowel stick or plastics tube between it and the bed for the full length of the bed. Although separated from the bed, the mold layer is preferably left on the bed while its exposed face is levelled (where necessary) by scraping, planing or otherwise. The mold layer is then edge trimmed to size by use of tin snips and finish planing.

Following its preparation as described above, the mold layer is then wrapped about and secured to the size roll. This action is best described with reference to the drawings herewith.

Figure 1:
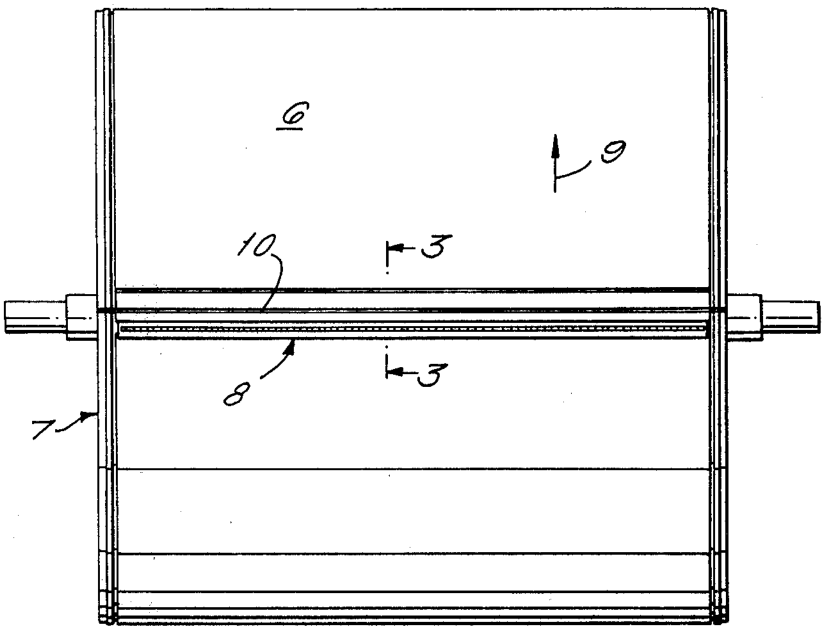
FIGS. 1 and 2 are side and end elevations respectively of a conventional size roll with a mold layer according hereto applied to it.
Figure 2:
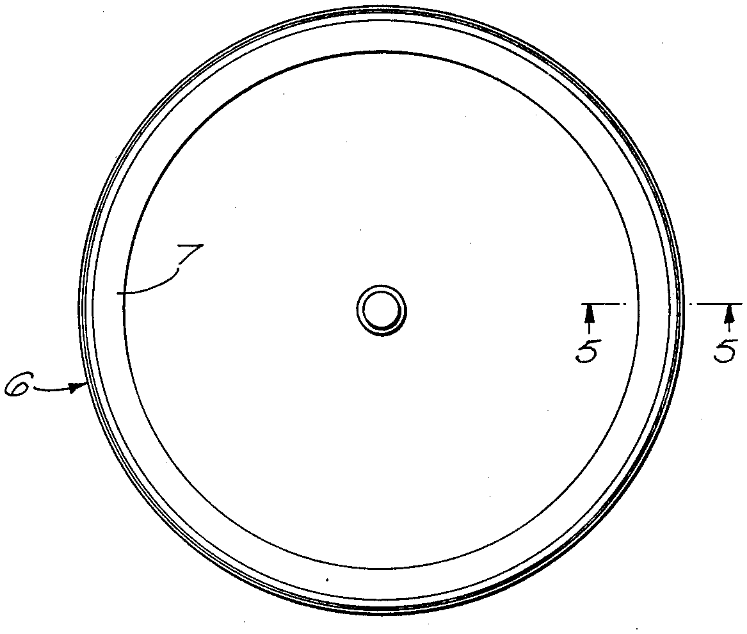
Figure 3:
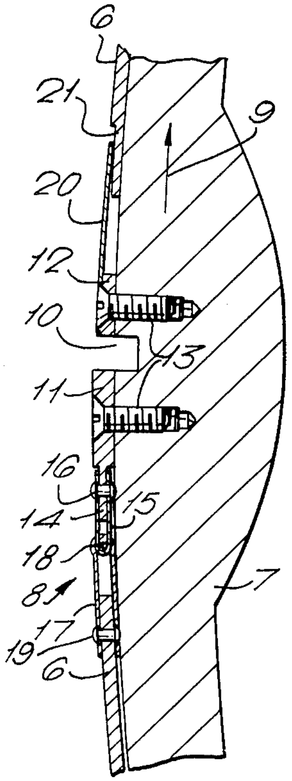
FIG. 3 is a fragmentary sectional end elevation taken (on an enlarged scale) on line 3—3 in FIG. 1.
Figure 4:
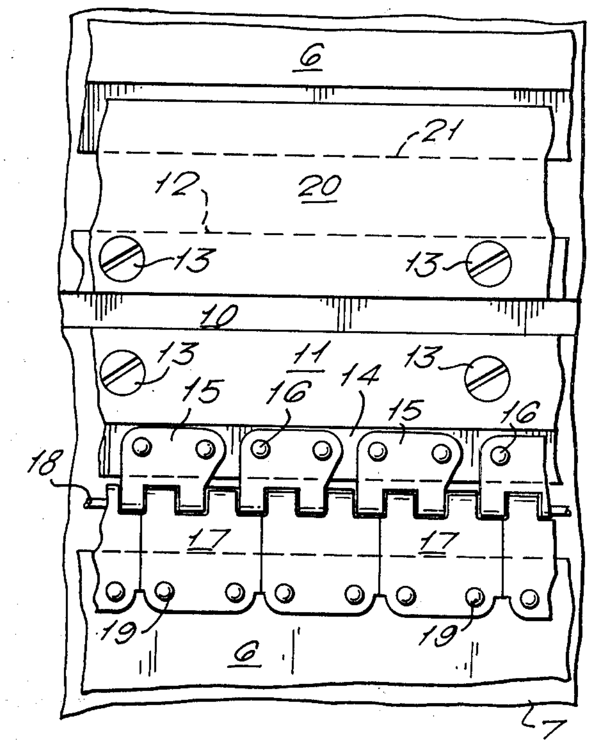
FIG. 4 is a fragmentary side elevation projected from FIG. 3.
Figure 5:
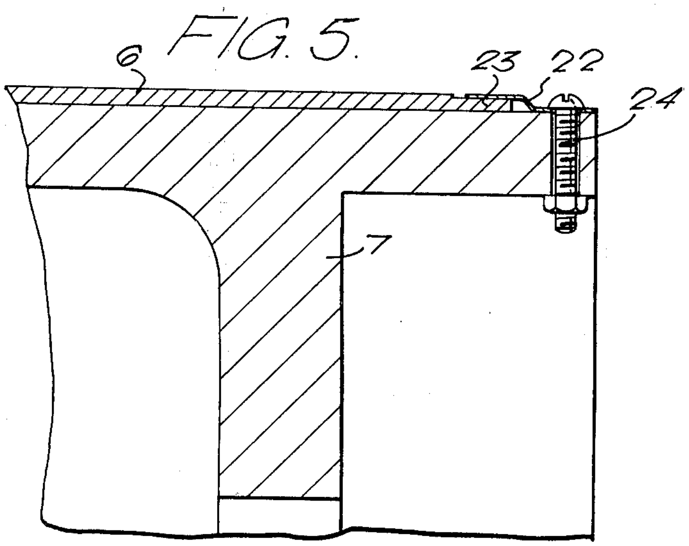
FIG. 5 is a fragmentary radial section taken (on the same scale as FIGS. 3 and 4) on line 5—5 in FIG. 2.

The mold layer 6 is mounted on the size roll 7, with its patterned surface out, so that it will be securely applied, but nevertheless free to move, relative to the size roll surface, sufficiently to accommodate overall dimensional changes due to expansion and contraction.

Thus the leading end of the wrapped layer is hinged to the roll, and the trailing end and the circumferential sides are merely restrained against radially outward movement relative to the roll.

The leading end of the layer is that which leads having regard to the direction of roll rotation. In the illustrated embodiment the leading end is that indicated at 8 when the direction of roll rotation is as indicated by arrows 9.

The roll 7 is of known kind. It has a transverse groove 10 to accommodate a severing wire (not shown) as well understood.

Groove 10 is flanked by mounting strips 11 and 12 secured to the roll by screws 13. Leading strip 11 has a tongue 14 to which hinge leaves 15 are secured, for example, by rivets 16. Complementary hinge leaves 17 are connected to leaves 15 by hinge pin 18, and the leaves 17 are joined to the leading end of the flexible mould layer 6, for example by rivets 19.

Strip 12 is a mounting for an axial keeper plate 20 which engages the trailing end 21 of the layer 6. Circumferential keeper plates 22 similarly engage with the circumferential edge margins 23 of layer 6. Plates 22 may be secured to the roll by bolts as indicated at 24.

When the flexible mould layer 6 has been secured on the size roll, a cylindrical sleeve of material is built up on the wrapped size roll in known manner, and when the required thickness of sleeve has been reached, the parting wire or other severing means are operated also in known manner. The severed sleeve is then removed from the size roll, flattened, edge trimmed and otherwise treated as though it were an ordinary unornamented sheet of the material.

We claim:

1. A method of producing sheets of fiber-reinforced cementitious material with embossed decorative patternings formed thereon, said method comprising the steps:

(a) forming a flat, flexible mold layer whereof the length and breadth are greater than the corresponding dimensions of the sheets to be produced, and having at least part of one face patterned in counterpart to the required embossed patterning, (b) closely wrapping said mold layer, patterned face out, circumferentially about a size roll, (c) removably securing the wrapped mold layer about said size roll so that the layer is free to move laterally and circumferentially on and relative to said size roll, to accommodate overall dimensional changes due to expansion and contraction, while being retained closely wrapped about that roll by fixedly securing only one circumferential end of the mold layer to the size roll and only restraining the other circumferential end and the sides of the mold layer against radially outward movement of the mold layer relative to the roll, (d) building up a sleeve on said wrapped size roll from a web of un-set fiber-reinforced cementitious material, (e) severing said sleeve in a direction parallel to the roll axis, (f) peeling said severed sleeve from said mold layer and size roll with said mold layer being free to move laterally and circumferentially in relation to and on said size roll by utilizing said freedom to move so as to facilitate release of the sleeve from said mold layer, and, (g) trimming and curing said severed sleeve, including removing edge margins thereof, to provide a cured, flat sheet of the desired dimensions.

2. The method of claim 1 wherein said mold layer is wrapped about said size roll substantially in full lateral and circumferential coverage thereof.

3. The method of claim 1 wherein said mold layer is formed on a moulding bed of a material having some parts more readily susceptible to erosion than other parts, and wherein the moulding face of said bed has been sand-blasted to increase the cavity depth of the more erodible parts of that bed.

* * * * *